US009804404B2

United States Patent
Lin

(10) Patent No.: US 9,804,404 B2
(45) Date of Patent: Oct. 31, 2017

(54) LIQUID CRYSTAL GRATING, DISPLAY DEVICE AND DRIVING METHOD

(71) Applicant: BOE TECHNOLOGY GROUP CO., LTD., Beijing (CN)

(72) Inventor: Chiachiang Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 331 days.

(21) Appl. No.: 14/420,887

(22) PCT Filed: May 15, 2014

(86) PCT No.: PCT/CN2014/077544
§ 371 (c)(1),
(2) Date: Feb. 10, 2015

(87) PCT Pub. No.: WO2015/089983
PCT Pub. Date: Jun. 25, 2015

(65) Prior Publication Data
US 2016/0033777 A1    Feb. 4, 2016

(30) Foreign Application Priority Data

Dec. 19, 2013 (CN) .......................... 2013 1 0706112

(51) Int. Cl.
G02F 1/1335 (2006.01)
G02B 27/22 (2006.01)
(Continued)

(52) U.S. Cl.
CPC ..... *G02B 27/2214* (2013.01); *G02F 1/13439* (2013.01); *G02F 1/29* (2013.01);
(Continued)

(58) Field of Classification Search
CPC .................. G02B 27/2214; G02F 2201/30
(Continued)

(56) References Cited

U.S. PATENT DOCUMENTS

2006/0146208 A1    7/2006 Kim

FOREIGN PATENT DOCUMENTS

CN    201673311 U    12/2010
CN    101957523 A    1/2011
(Continued)

OTHER PUBLICATIONS

First Office Action regarding Chinese application No. 201310706112.4, dated Nov. 4, 2015. Translation provided by Dragon Intellectual Property Law Firm.
(Continued)

*Primary Examiner* — Wen-Ying P Chen
(74) *Attorney, Agent, or Firm* — Harness, Dickey & Pierce, P.L.C.

(57) ABSTRACT

The liquid crystal grating of the present disclosure may include a plurality of grating element groups for forming dark fringes and transparent fringes. The dark fringe of each grating element group may be arranged adjacent to a transparent fringe of a neighboring grating element group. Each grating element group may include a plurality of first grating elements and at least one second grating element arranged parallel to each other. At least one of the first grating elements is transparent so as to form the transparent fringe of the grating element group, and different first grating elements are enabled to be transparent so as to change positions of the transparent fringes. The second grating element is opaque, the first grating elements and the second grating element that are opaque may be used to form the dark fringes of the grating element group, and the second grating element may have a width greater than that of each of the first grating elements.

14 Claims, 2 Drawing Sheets

(51) Int. Cl.
*H04N 13/04* (2006.01)
*G02F 1/29* (2006.01)
*G02F 1/1343* (2006.01)
*G02F 1/1347* (2006.01)

(52) U.S. Cl.
CPC ....... *H04N 13/0409* (2013.01); *G02F 1/1347* (2013.01); *G02F 1/133512* (2013.01); *G02F 1/134309* (2013.01); *G02F 2201/30* (2013.01)

(58) Field of Classification Search
USPC .......................................................... 349/15
See application file for complete search history.

(56) References Cited

FOREIGN PATENT DOCUMENTS

| | | |
|---|---|---|
| CN | 201796212 U | 4/2011 |
| CN | 102681180 A | 9/2012 |
| CN | 102928904 A | 2/2013 |
| CN | 103197423 A | 7/2013 |
| CN | 103197474 A | 7/2013 |
| CN | 103209332 A | 7/2013 |
| CN | 203054416 U | 7/2013 |

OTHER PUBLICATIONS

Written Opinion of the International Searching Authority for international application No. PCT/CN2014/077544.

Third Office Action regarding Chinese application No. 201310706112.4, dated Sep. 8, 2016. Translation provided by Dragon Intellectual Property Law Firm.

US 9,804,404 B2

LIQUID CRYSTAL GRATING, DISPLAY DEVICE AND DRIVING METHOD

CROSS-REFERENCE TO RELATED APPLICATIONS

This application is the U.S. national phase of PCT Application No. PCT/CN2014/077544 filed on May 15, 2014, which claims priority to Chinese Patent Application No. 201310706112.4 filed on Dec. 19, 2013, the disclosures of which are incorporated in their entirety by reference herein.

TECHNICAL FIELD

The present disclosure relates to the field of optical elements, in particular to a liquid crystal grating, a display device and a driving method.

BACKGROUND

Display technology has been developed from a two-dimension (2D) display technology to a three-dimension (3D) display technology. The 3D display technology has been developing rapidly in recent years, and as a research hotspot, it has been widely used in such fields as medical cares, advertisements, militaries, exhibitions and games.

For the early 3D display technology, a 3D spectacle is mainly used to view a 3D image, while a binocular parallax-based autostereoscopic 3D display device is used as a mainstream product now. Liquid crystal grating is one of the elements capable of achieving the autostereoscopic 3D display. FIG. 1 is a schematic view showing the principle of separating light transmission paths for a left-eye image and a right-eye image by the liquid crystal grating. Due to the existence of the liquid crystal grating 100, the left-eye image displayed by a display panel 200 can merely be viewed by a left eye, and the right-eye image can merely be viewed by a right eye, so as to provide a stereoscopic parallax effect for a viewer, thereby to achieve the 3D display.

However, for the autostereoscopic 3D display technology, a viewing position is fixed, i.e., only when the viewer is located within a 3D viewing region could an appropriate 3D image be viewed. When the viewer is not located within this region, such defects as a reverse visual effect, a ghost image and a distorted image will occur, thereby the 3D display effect will be adversely affected.

In this regard, there is an urgent demand to develop a liquid crystal grating with movable slit position, so as to enable the slit position of the grating to match positions of the eyes, thereby to achieve an optimal visual effect.

However, for the existing liquid crystal grating with movable slit position, there are too many electrodes, and these electrodes are arranged in close proximity to each other. As a result, a short circuit, and thereby a line defect, is prone to happen.

SUMMARY

An object of the present disclosure is to provide a liquid crystal grating, a display device and a driving method, so as to adjust a slit position of the liquid crystal grating, thereby to prevent a short circuit and a line defect due to an excessive number of electrodes in the prior art.

In one aspect, the present disclosure provides a liquid crystal grating, including a plurality of grating element groups for forming dark fringes and transparent fringes. The dark fringe of each grating element group may be arranged adjacent to a transparent fringe of adjacent neighboring grating element group. Each grating element group may include a plurality of first grating elements and at least one second grating element arranged parallel to each other. At least one of the first grating elements may be transparent so as to form the transparent fringe of the grating element group, and different first grating elements are enabled to be transparent so as to change positions of the transparent fringes. The second grating element may be opaque, an opaque first grating elements and the second grating element may be used to form the dark fringes of the grating element group, and the second grating element may have a width greater than that of each of the first grating elements.

Alternatively, there may be one second grating element, and the second grating element may have a width greater than or equal to a total width of the transparent fringes of the grating element group.

Alternatively, each of the first grating elements may have an identical width.

Alternatively, there may be four first grating elements, two neighboring first grating elements are transparent so as to form the transparent fringes of the grating element group, and each of the first grating elements may have a width equal to a half of the total width of the transparent fringes of the grating element group.

Alternatively, there may be five first grating elements, three neighboring first grating elements are transparent so as to form the transparent fringes of the grating element group, and each of the first grating elements may have a width equal to one third of the total width of the transparent fringes of the grating element group.

Alternatively, there may be seven first grating elements, three neighboring first grating elements are transparent so as to form the transparent fringes of the grating element group, and each of the first grating elements may have a width equal to one third of the total width of the transparent fringes of the grating element group.

Alternatively, when there are M first grating elements, each of the first grating elements may have a width equal to one $N^{th}$ of the total width of the transparent fringes of the grating element group, wherein N is an integer less than M.

Alternatively, the liquid crystal grating may further include a first transparent electrode and a second transparent electrode arranged opposite to each other, and a liquid crystal layer arranged between the first transparent electrode and the second transparent electrode. The grating element group may be arranged on the first transparent electrode and consist of a plurality of stripe electrode units arranged parallel to each other. Each of the first grating elements may correspond to one electrode unit, and the second grating element may also correspond to one electrode unit.

In another aspect, the present disclosure provides a display device including a display panel and the above-mentioned liquid crystal grating.

In yet another aspect, the present disclosure provides a method for driving the above-mentioned liquid crystal grating, including steps of:

controlling a first portion of neighboring grating elements within the first grating elements to be transparent, so as to form the transparent fringes of the grating element group, and controlling the second grating element and a second portion of grating elements within the first grating elements to be opaque, so as to form the dark fringes of the grating element group, thereby to provide a first state of the liquid crystal grating, wherein the first grating elements consist of the first portion of grating elements and the second portion of grating elements; and controlling a third portion of neighboring grating elements within the first grating elements to be transparent, so as to form the transparent fringes of the grating element group, and controlling the second grating element and a fourth portion of grating elements within the first grating elements to be opaque, so as to form the dark fringes of the grating element group, thereby to provide a second state of the liquid crystal grating, wherein the first grating elements consist of the third portion of grating elements and the fourth portion of grating elements, and the first portion of grating elements is different from the third portion of grating elements.

The present disclosure at least has the following advantageous effects. According to the liquid crystal grating of the present disclosure, the second grating element dedicated for forming the dark fringe has a width greater than any of the first grating elements, and the liquid crystal grating includes a plurality of grating elements with different widths. In addition, the widths of the first grating element and the second grating element may be set in accordance with widths of the transparent fringes and dark fringes desired to be formed by the liquid crystal grating, respectively. As compared with the prior art where the grating elements have an identical width, it is able to reduce the number of the grating elements, thereby to prevent a short circuit and a line defect due to an excessive number of electrodes.

DETAILED DESCRIPTION

Figure 1:
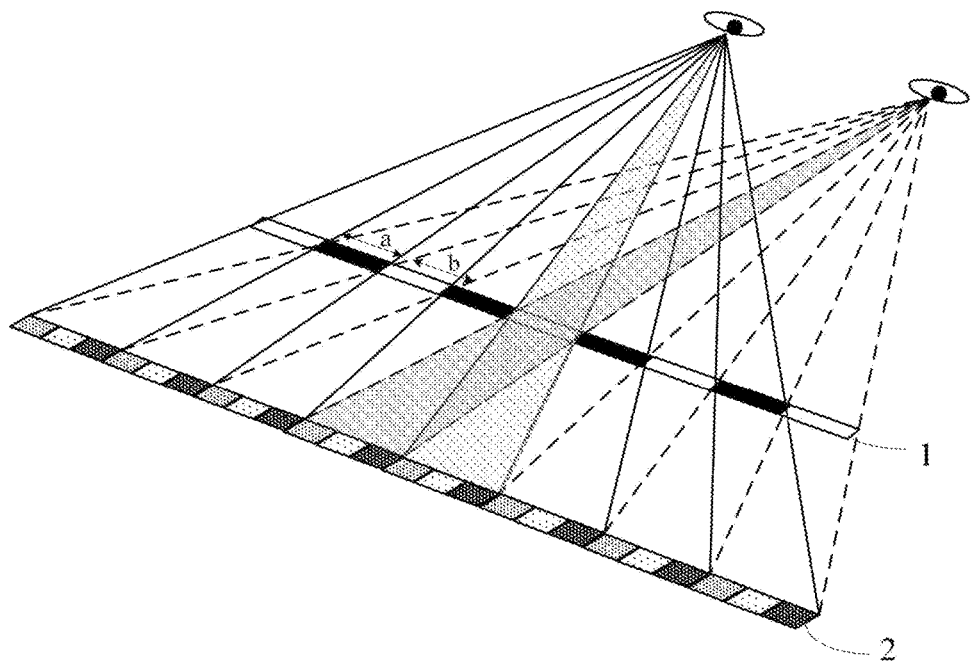
FIG. 1 is a schematic view showing the principle of separating light transmission paths for a left-eye image and a right-eye image by a liquid crystal grating.

In order to make the objects, the technical solutions and the advantages of the present disclosure more apparent, the present disclosure will be described hereinafter in conjunction with the drawings and the embodiments.

A liquid crystal grating of the present disclosure includes a plurality of grating element groups for forming dark fringes and transparent fringes, and the dark fringe of each grating element group is arranged adjacent to a transparent fringe of a neighboring grating element group. Each grating element group includes a plurality of first grating elements and at least one second grating element arranged parallel to each other. At least one of the first grating elements is transparent so as to form the transparent fringe of the grating element group, and different first grating elements are enabled to be transparent so as to change positions of the transparent fringes. The second grating element is opaque, and the first grating elements and the second grating element that are opaque are used to form the dark fringes of the grating element group, and the second grating element has a width greater than that of each of the first grating elements.

According to the liquid crystal grating of the present disclosure, the grating element (the second grating element) dedicated for forming the dark fringes and the grating elements (the first grating elements) with an unfixed state, i.e., for forming the transparent fringes or dark fringes, are used, and the plurality of first grating elements may be changed between a transparent state and an opaque state so as to move the slits of the liquid crystal grating. In addition, the second grating element dedicated for merely forming the dark fringe has a width greater than that of each of the first grating elements, so that the liquid crystal grating includes a plurality of grating elements with different widths. The widths of the first grating elements and the second grating element may be set in accordance with widths of the transparent fringes and the dark fringes desired to be formed by the liquid crystal grating, respectively. As compared with the prior art where the grating elements have an identical width, it is able to reduce the number of the grating elements.

In particular, when there is one second grating element, the second grating element may be of a width greater than or equal to a total width of the transparent fringes, for example, twice or triple the total width of the transparent fringes. In this way, it is able to further reduce the number of the grating elements, thereby to prevent a short circuit and a line defect due to an excessive number of electrodes.

The term "grating element group" mentioned in the present disclosure may also be defined as one grating pitch, i.e., a range between two neighboring transparent fringes. The grating element group consists of a plurality of grating elements, which are combined so as to form the dark fringes and the transparent fringes. According to the definition of the term "grating element group", a dark fringe of one grating element group is located adjacent to a transparent fringe of a neighboring grating element group. In addition, a width of the transparent fringe of the grating element group forms "one unit width" of the liquid crystal grating.

According to the liquid crystal grating of the present disclosure, within one grating element group, at least one grating element is always used for forming the dark fringe, and states of the other grating elements may be adjusted so as to adjust positions of the transparent fringes.

In addition, in a preferred embodiment of the present disclosure, there may be one or more second grating elements (which are dedicated for forming the dark fringes) in one grating element group, while there may be more than one first grating elements (the states of which may be adjusted). The grating element is a minimum unit of the liquid crystal grating, and one grating element group consists of a plurality of grating elements.

Figure 2:
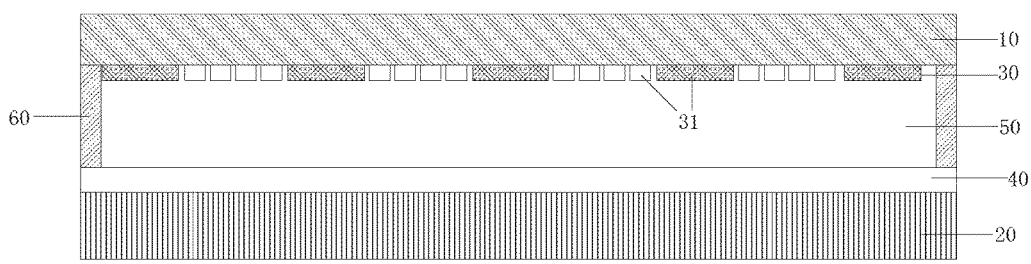
FIG. 2 is a schematic view showing a liquid crystal grating according to one embodiment of the present disclosure.

FIG. 2 is a schematic view showing the liquid crystal grating according to one embodiment of the present disclosure. In this embodiment, the liquid crystal grating includes a first substrate 10 and a second substrate 20 arranged opposite to each other. A first transparent electrode 30 is arranged on the first substrate 10, a second transparent electrode 40 is arranged on the second substrate 20, and a liquid crystal layer 50 is arranged between the first transparent electrode 30 and the second transparent electrode 40. In addition, a spacer 60 is arranged between the first transparent electrode 30 and the second transparent electrode 40 so as to provide support for a thickness of the liquid crystal grating filled with the liquid crystal layer 50.

Usually, the first transparent electrode 30 consists of a plurality of stripe electrode units 31 arranged parallel to each other, and the second transparent electrode 40 consists of block-like electrode units. When different control voltages are applied to the respective stripe electrode units 31 of the first transparent electrode 30, liquid crystal molecules in the liquid crystal layer 50 will rotate under the effect of different electric fields between the first transparent electrode 30 and the second transparent electrode 40, so as to form the dark fringes or the transparent fringes. The dark fringes and the transparent fringes are arranged at intervals.

Based on the above, the states of the liquid crystal grating may be determined by controlling the voltages applied to the respective electrode units 31 of the first transparent electrode 30, so in this embodiment, the grating elements in the grating element group include the respective electrode units of the first transparent electrode 30, i.e., the stripe electrode units 31 arranged parallel to each other on the first transparent electrode 30 form the first grating elements and the second grating element. Each grating element may include one or more electrode units 31.

In this embodiment, the electrode unit 31 is the minimum unit of the liquid crystal grating, so it may correspond to the above-mentioned grating element. The second grating element dedicated for merely forming the dark fringe corresponds to one electrode unit 31, a width of which may be set as greater than a total width of the transparent fringes of the grating element group, i.e., greater than one unit width of the liquid crystal grating. To be specific, the width of the electrode unit 31 may be set in accordance with image requirements of a display device. As compared with the prior art where the different electrode units 31 of the liquid crystal grating have an identical width, it is able to reduce the number of the electrodes.

Alternatively, according to a specific embodiment of the present disclosure, the first grating elements each has an identical width, i.e., a width of the electrode unit 31 corresponding to each first grating element. This width is less than a total width of the transparent fringes of the grating element group, i.e., less than one unit width of the liquid crystal grating.

To be specific, when there are M first grating elements, each first grating element has a width equal to one $N^{th}$ of the total width of the transparent fringes of the grating element group, where N is an integer less than M.

The structure of the liquid crystal grating according to the present disclosure will be described hereinafter in details.

Figure 3:
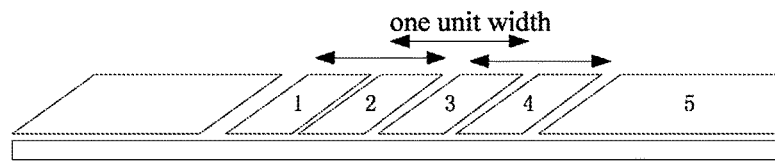
FIG. 3 is a schematic view showing the arrangement of grating elements in the liquid crystal grating according to the first embodiment of the present disclosure.

FIG. 3 is a schematic view showing the arrangement of the grating elements (or the electrode units 31) in the liquid crystal grating according to the first embodiment of the present disclosure. In this embodiment, as shown in FIG. 3, grating elements 1, 2, 3, 4 and 5 constitute one grating element group. A control voltage is applied to the grating element 5 so as to be dedicated for forming the dark fringe, i.e., the grating element 5 is just the above-mentioned second grating element. A portion of the grating elements 1, 2, 3 and 4 are enabled to be transparent by controlling the control voltages applied to these grating elements. The transparent grating elements are changed so as to change transparent positions, i.e., slit positions, of the liquid crystal grating, so the grating elements 1, 2, 3 and 4 are just the above-mentioned first grating elements. Each of the first grating elements has a width equal to a half of the total width of the transparent fringes of the grating element group.

In this embodiment, the grating elements 1, 2, 3 and 4 have an identical width. When this width is a half of one unit width, two neighboring grating elements may be transparent so as to form the transparent fringes of the grating element group. Any two of the grating elements may be transparent by changing the control voltages applied to the grating elements 1, 2, 3 and 4, so as to adjust the slit positions of the liquid crystal grating. The slit positions may be moved minimally by a distance of a half of one unit width.

Referring to FIG. 3, when the control voltages are applied so as to enable the grating elements 2 and 3 to form the transparent fringes and enable the grating elements 4 and 5 to form the dark fringes, slits of the grating element group are located at positions corresponding to the grating elements 2 and 3. At this time, the liquid crystal grating is in a first state. When the control voltages are applied so as to enable the grating elements 1 and 2 to form the transparent fringes and enable the grating elements 3 and 4 to form the dark fringes, the slits of the grating element group are located at positions corresponding to the grating elements 1 and 2. At this time, the liquid crystal grating is in a second state and as compared with that in the first state, the slits are moved left by a distance of a half of one unit width. When the control voltages are applied so as to enable the grating elements 3 and 4 to form the transparent fringes and enable the grating elements 1 and 2 to form the dark fringes, the slits of the grating element group are located at positions corresponding to the grating elements 3 and 4. At this time, the liquid crystal grating is in a third state, and the slits are moved right by a distance of one unit width as compared with that in the second state and moved right by a distance of a half of one unit width as compared with that in the first state.

In addition, in the first embodiment, the grating element 5 dedicated for forming the dark fringe has a width greater than one unit width, for example, four unit widths, so as to reduce the number of the grating elements.

Figure 4:
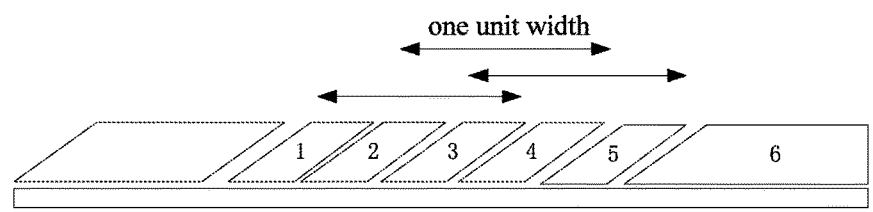
FIG. 4 is a schematic view showing the arrangement of the grating elements in the liquid crystal grating according to the second embodiment of the present disclosure.

FIG. 4 is a schematic view showing the arrangement of the grating elements (or the electrode units 31) in the liquid crystal grating according to the second embodiment of the present disclosure. In this embodiment, grating elements 1, 2, 3, 4, 5 and 6 constitute one grating element group. A control voltage is applied to the grating element 6 so as to be dedicated for forming the dark fringe, i.e., the grating element 6 is just the above-mentioned second grating element. A portion of the grating elements 1, 2, 3, 4 and 5 are enabled to be transparent by controlling the control voltages applied to these grating elements. The transparent grating elements are changed so as to change the transparent positions, i.e., the slit positions, of the liquid crystal grating, so the grating elements 1, 2, 3, 4 and 5 are just the above-mentioned first grating elements. Each first grating element has a width equal to one third of the total width of the transparent fringes of the grating element group.

In the first embodiment, the grating elements 1, 2, 3, 4 and 5 have an identical width. When this width is one third of one unit width, three neighboring grating elements are transparent so as to form the transparent fringes of the grating element group. By changing the control voltages applied to the grating elements 1, 2, 3, 4 and 5, the slits of the liquid crystal grating may be moved minimally by a distance of one third of one unit width.

Referring to FIG. 4, when the control voltages are applied so as to enable the grating elements 2, 3 and 4 to form the transparent fringes and enable the grating elements 1 and 5 to form the dark fringes, the slits of the grating element group are located at positions corresponding to the grating elements 2, 3 and 4. At this time, the liquid crystal grating is in the first state. When the control voltages are applied so as to enable the grating elements 1, 2 and 3 to form the transparent fringes and enable the grating elements 4 and 5 to form the dark fringes, the slits of the grating element group are located at positions corresponding to the grating elements 1, 2 and 3. At this time, the liquid crystal grating is in the second state, and as compared with that in the first state, the slits are moved left by a distance of one third of one unit width. When the control voltages are applied so as to enable the grating elements 3, 4 and 5 to form the transparent fringes and enable the grating elements 1 and 2 to form the dark fringes, the slits of the grating element group are located positions corresponding to the grating elements 3, 4 and 5. At this time, the liquid crystal grating is in the third state, and the slits are moved right by a distance of one third of one unit width as compared with that in the first state and moved right by a distance of two thirds of one unit width as compared with that in the second state.

As similar to the first embodiment, the grating element 6 dedicated for forming the dark fringe in the second embodiment has a width greater than one unit width, for example, four unit widths, so as to reduce the number of the grating elements.

Figure 5:
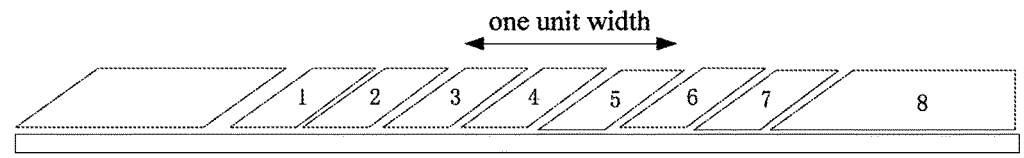
FIG. 5 is a schematic view showing the arrangement of the grating elements in the liquid crystal grating according to the third embodiment of the present disclosure.

FIG. 5 is a schematic view showing the arrangement of the grating elements (or the electrode units 31) in the liquid crystal grating according to the third embodiment of the present disclosure. In this embodiment, the grating elements 1, 2, 3, 4, 5, 6, 7 and 8 constitute one grating element group. A control voltage is applied to the grating element 8 so as to be dedicated for forming the dark fringe, i.e., the grating element 8 is just the above-mentioned second grating element. A portion of the grating elements 1, 2, 3, 4, 5, 6 and 7 is enabled to be transparent by controlling the control voltages applied to these grating elements. The transparent grating elements are changed so as to change the transparent positions, i.e., the slit positions, of the liquid crystal grating, so the grating elements 1, 2, 3, 4, 5, 6 and 7 are just the above-mentioned first grating elements. Each of the first grating elements has a width equal to one third of the total width of the transparent fringes of the grating element group.

In this embodiment, the gating elements 1, 2, 3, 4, 5, 6 and 7 have an identical width. When this width is one third of one unit width, three neighboring grating elements are transparent so as to form the transparent fringes of the grating element group. By changing the control voltages applied to the grating elements 1, 2, 3, 4, 5, 6 and 7, the slits of the liquid crystal grating may be moved minimally by a distance of one third of one unit width.

Referring to FIG. 5, when the control voltages are applied so as to enable the grating elements 3, 4 and 5 to form the transparent fringes and enable the grating elements 1, 2, 6 and 7 to form the dark fringes, the slits of the grating element group are located at positions corresponding to the grating elements 3, 4 and 5. At this time, the liquid crystal grating is in the first state. When the control voltages are applied so as to enable the grating elements 2, 3 and 4 to form the transparent fringes and enable the grating elements 1, 5, 6 and 7 to form the dark fringes, the slits of the grating element group are located at positions corresponding to the grating elements 2, 3 and 4. At this time, the liquid crystal grating is in the second state, and as compared that in the first state, the slits are moved left by a distance of one third of one unit width. When the control voltages are applied so as to enable the grating elements 1, 2 and 3 to form the transparent fringes and enable the grating elements 4, 5, 6 and 7 to form the dark fringes, the slits of the grating element group are located at positions corresponding to the grating elements 1, 2 and 3. At this time, the liquid crystal grating in the third state, and the slits are moved left by a distance of one third of one unit width as compared with that in the second state and moved left by a distance of two thirds of one unit width as compared with that in the first state. When the control voltages are applied so as to enable the grating elements 4, 5 and 6 to form the transparent fringes and enable the grating elements 1, 2, 3 and 7 to form the dark fringes, the slits of the grating element group are located at positions corresponding to the grating elements 4, 5 and 6. At this time, the liquid crystal grating is in a fourth state, and the slits are moved right by a distance of one unit width as compared with that in the third state and moved right by a distance of one third of one unit width as compared with that in the first state. When the control voltages are applied so as to enable the grating elements 5, 6 and 7 to form the transparent fringes and enable the grating elements 1, 2, 3 and 4 to form the dark fringes, the slits of the grating element group are located at positions corresponding to the grating elements 5, 6 and 7. At this time, the liquid crystal grating is in a fifth state, and the slits are moved right by a distance of one third of one unit width as compared with that in the fourth state and moved right by a distance of two thirds of one unit width as compared with that in the first state.

As similar to the first embodiment and the third embodiment, the grating element 8 dedicated for forming the dark fringe in the third embodiment has a width greater than one unit width, for example, three unit widths, so as to reduce the number of the grating elements.

According to the liquid crystal grating of the present disclosure, the first grating element may be of a width less than one unit width and the slit position of the grating element group may be changed among several first grating elements, so as to move the slits minimally by a distance of one unit width. The grating element may be of a width a half, one third or one quarter of one unit width of the liquid crystal grating, but not limited to those mentioned in the above embodiments. Hence, according to the present disclosure, it is able to precisely move the slits of the liquid crystal grating within one unit width.

In addition, referring to FIG. 2, each first grating element corresponds to one electrode unit 31, and one second grating element also corresponds to one electrode unit 31. The second grating element dedicated for forming the dark fringe merely includes one electrode unit 31, which may be of a width greater than one unit width. The electrode units 31 of the first grating elements each has a width less than one unit width. According to the present disclosure, the first transparent electrode includes more than two kinds of stripe electrode units with different widths, and these electrode units are arranged alternately and repeatedly. As a result, it is able to reduce the number of the electrodes while ensuring the movable slits.

In another aspect, the present disclosure provides a display device including a display panel and the above-mentioned liquid crystal grating.

The structure of the liquid crystal grating in the display device may refer to the above description, and it will not be repeated herein. In addition, a person skilled in the art should know the structure of the display device obtained by combining the liquid crystal grating and the display panel. This structure is not an important part of the present disclosure, and thus will not be particularly described herein.

In yet another aspect, the present disclosure provides a method for driving the liquid crystal grating, including steps of:

controlling a first portion of the neighboring grating elements within the first grating elements to be transparent, so as to form the transparent fringes of the grating element group, and controlling the second grating element and a second portion of the grating elements within the first grating elements to be opaque, so as to form the dark fringes of the grating element group, thereby to provide a first state of the liquid crystal grating, wherein the first grating elements consist of the first portion of grating elements and the second portion of grating elements; and controlling a third portion of neighboring grating elements within the first grating elements to be transparent, so as to form the transparent fringes of the grating element group, and controlling the second grating element and a fourth portion of grating elements within the first grating elements to be opaque, so as to form the dark fringes of the grating element group, thereby to provide a second state of the liquid crystal grating, wherein the first grating elements consist of the third portion of grating elements and the fourth portion of grating elements, and the first portion of grating elements is different from the third portion of grating elements.

By taking the second embodiment shown in FIG. 4 as an example, when the control voltages are applied so as to enable the grating elements 2, 3 and 4 to form the transparent fringes and enable the grating elements 1 and 5 to form the dark fringes, the slits of the grating element group are located at positions corresponding to the grating elements 2, 3 and 4. At this time, the liquid crystal grating is in the first state, the grating elements 2, 3 and 4 constitute the first portion of grating elements, and the grating elements 1 and 5 constitute the second portion of grating elements.

When the control voltages are applied so as to enable the grating elements 1, 2 and 3 to form the transparent fringes and enable the grating elements 4 and 5 to form the dark fringes, the slits of the grating element group are located at positions corresponding to the grating elements 1, 2 and 3. At this time, the liquid crystal grating is in the second state, the grating elements 1, 2 and 3 constitute the third portion of grating elements, and the grating elements 4 and 5 constitute the fourth portion of grating elements.

According to the driving method of the present disclosure, when a driving mode is changed by different control voltage signals, the slit position will be changed so as to change the states of the liquid crystal grating. In different states, the positions of the grating elements for forming the transparent fringes are different for different states, and the positions of the grating elements for forming the dark fringes are different for different states. These positions will be changed along with a change in the driving mode. The first portion of grating elements and the second portion of grating elements indicate the grating elements for forming the transparent fringes and the dark fringes in the first state, respectively, and the third portion of grating elements and the fourth portion of grating elements indicate the grating elements for forming the transparent fringes and the dark fringes in the second state, respectively. The first portion of grating elements is different from the third portion of grating elements, and the second portion of grating elements is different from the fourth portion of grating elements. These portions of grating elements are differentiated from each other so as to illustrate the changes in the grating elements for forming the transparent fringes and the dark fringes when the liquid crystal grating is in two different states.

According to the above-mentioned driving method, the slit position of the liquid crystal grating may be adjusted within a predetermined range of the first grating elements. Different portions of grating elements are enabled to be transparent, so as to change the slit position, thereby to form the liquid crystal grating with movable slits. As compared with the prior art, it is able to reduce the number of the electrodes in the liquid crystal grating, thereby to prevent a short circuit and a line defect due to an excessive number of the electrodes.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A liquid crystal grating, comprising a plurality of grating element groups for forming dark fringes and transparent fringes, wherein:

each grating element group comprises a plurality of first grating elements and at least one second grating element arranged parallel to each other, at least one of the first grating elements is transparent so as to form the transparent fringe of the grating element group, and different first grating elements are enabled to be transparent so as to change positions of the transparent fringes, the second grating element is opaque, and the first grating elements and the second grating element that are opaque are used to form the dark fringes of the grating element group, the second grating element has a width greater than that of each of the first grating elements, and each grating element group comprises M first grating elements, each of the first prating elements has a width equal to one $N^{th}$ of a total width of the transparent fringes of the grating element group, and N is an integer, M is an integer, and N is less than M.

2. The liquid crystal grating according to claim 1, wherein there is one second grating element, and the second grating element has a width greater than or equal to a total width of the transparent fringes of the grating element group.

3. The liquid crystal grating according to claim 1, wherein each grating element group comprises four first grating elements, two neighboring first grating elements are transparent so as to form the transparent fringes of the grating element group, and each of the first grating elements has a width equal to a half of the total width of the transparent fringes of the grating element group.

4. The liquid crystal grating according to claim 1, wherein each grating element group comprises five first grating elements, three neighboring first grating elements are transparent so as to form the transparent fringes of the grating element group, and each of the first grating elements has a width equal to one third of the total width of the transparent fringes of the grating element group.

5. The liquid crystal grating according to claim 1, wherein each grating element group comprises seven first grating elements, three neighboring first grating elements are transparent so as to form the transparent fringes of the grating element group, and each of the first grating elements has a width equal to one third of the total width of the transparent fringes of the grating element group.

6. The liquid crystal grating according to claim 1, wherein the liquid crystal grating further comprises a first transparent electrode and a second transparent electrode arranged opposite to each other, and a liquid crystal layer arranged between the first transparent electrode and the second transparent electrode, and wherein the grating element group is arranged on the first transparent electrode and consists of a plurality of stripe electrode units arranged parallel to each other, each of the first grating elements corresponds to one electrode unit, and the second grating element also corresponds to one electrode unit.

7. A method for driving the liquid crystal grating according to claim 1, comprising steps of:
controlling a first portion of neighboring grating elements within the first grating elements to be transparent, so as to form the transparent fringes of the grating element group, and controlling the second grating element and a second portion of grating elements within the first grating elements to be opaque, so as to form the dark fringes of the grating element group, thereby to provide a first state of the liquid crystal grating, wherein the first grating elements consist of the first portion of grating elements and the second portion of grating elements; and
controlling a third portion of neighboring grating elements within the first grating elements to be transparent, so as to form the transparent fringes of the grating element group, and controlling the second grating element and a fourth portion of grating elements within the first grating elements to be opaque, so as to form the dark fringes of the grating element group, thereby to provide a second state of the liquid crystal grating, wherein the first grating elements consist of the third portion of grating elements and the fourth portion of grating elements, and the first portion of grating elements is different from the third portion of grating elements.

8. The method according to claim 7, wherein there is one second grating element, and the second grating element has a width greater than or equal to a total width of the transparent fringes of the grating element group.

9. A display device, comprising:
a display panel; and
a liquid crystal grating, comprising a plurality of grating element groups for forming dark fringes and transparent fringes wherein:
each grating element group comprises a plurality of first grating elements and at least one second grating element arranged parallel to each other,
at least one of the first grating elements is transparent so as to form the transparent fringe of the grating element group, and different first grating elements are enabled to be transparent so as to change positions of the transparent fringes,
the second grating element is opaque, and the first grating elements and the second grating element that are opaque are used to form the dark fringes of the grating element group,
the second grating element has a width greater than that of each of the first grating elements, and
each grating element group comprises M first grating elements, each of the first prating elements has a width equal to one $N^{th}$ of a total width of the transparent fringes of the grating element group, and N is an integer, M is an integer, and N is less than M.

10. The display device according to claim 9, wherein there is one second grating element, and the second grating element has a width greater than or equal to a total width of the transparent fringes of the grating element group.

11. The display device according to claim 9, wherein each grating element group comprises four first grating elements, two neighboring first grating elements are transparent so as to form the transparent fringes of the grating element group, and each of the first grating elements has a width equal to a half of the total width of the transparent fringes of the grating element group.

12. The display device according to claim 9, wherein each grating element group comprises five first grating elements, three neighboring first grating elements are transparent so as to form the transparent fringes of the grating element group, and each of the first grating elements has a width equal to one third of the total width of the transparent fringes of the grating element group.

13. The display device according to claim 9, wherein each grating element group comprises seven first grating elements, three neighboring first grating elements are transparent so as to form the transparent fringes of the grating element group, and each of the first grating elements has a width equal to one third of the total width of the transparent fringes of the grating element group.

14. The display device according to claim 9, wherein the liquid crystal grating further comprises a first transparent electrode and a second transparent electrode arranged opposite to each other, and a liquid crystal layer arranged between the first transparent electrode and the second transparent electrode, and
wherein the grating element group is arranged on the first transparent electrode and consists of a plurality of stripe electrode units arranged parallel to each other, each of the first grating elements corresponds to one electrode unit, and the second grating element also corresponds to one electrode unit.

* * * * *